US009973638B2

United States Patent
Pring

(10) Patent No.: US 9,973,638 B2
(45) Date of Patent: May 15, 2018

(54) PERIPHERAL BUS VIDEO COMMUNICATION USING INTERNET PROTOCOL

(71) Applicant: QSC, LLC, Costa Mesa, CA (US)

(72) Inventor: Ryan Pring, Superior, CO (US)

(73) Assignee: QSC, LLC, Costa Mesa, CA (US)

( * ) Notice: Subject to any disclaimer, the term of this patent is extended or adjusted under 35 U.S.C. 154(b) by 0 days. days.

(21) Appl. No.: 15/007,080

(22) Filed: Jan. 26, 2016

(65) Prior Publication Data

US 2017/0214807 A1 Jul. 27, 2017

(51) Int. Cl.
| | | |
|---|---|---|
| H04N 1/00 | (2006.01) | |
| H04N 5/232 | (2006.01) | |
| H04L 29/06 | (2006.01) | |
| H04L 12/28 | (2006.01) | |
| G06F 13/16 | (2006.01) | |
| G06F 13/42 | (2006.01) | |

(52) U.S. Cl.
CPC ..... *H04N 1/00217* (2013.01); *G06F 13/1673* (2013.01); *G06F 13/4282* (2013.01); *H04L 12/2836* (2013.01); *H04L 65/104* (2013.01); *H04L 65/605* (2013.01); *H04L 69/08* (2013.01); *H04N 5/232* (2013.01)

(58) Field of Classification Search
CPC .... H04N 1/00217; H04N 5/232; H04N 5/247; H04N 5/44; H04N 21/4223; H04N 7/14–7/15; G06F 13/4282; G06F 13/1673; H04L 69/08; H04L 12/2836; H04L 65/104; H04L 65/605
USPC ..... 348/14.01–14.12, 207.01, 207.11, 207.2, 348/211.99–211.14, 143–159
See application file for complete search history.

(56) References Cited

U.S. PATENT DOCUMENTS

| | | | | |
|---|---|---|---|---|
| 7,162,554 | B1* | 1/2007 | Cole | G06F 13/385 710/10 |
| 7,506,057 | B2* | 3/2009 | Bigioi | H04L 67/06 709/202 |
| 7,644,211 | B2* | 1/2010 | Toebes | H04L 67/14 370/402 |
| 8,553,882 | B2* | 10/2013 | Cholas | H04L 63/0464 370/401 |
| 9,116,821 | B2* | 8/2015 | Scragg, Jr. | G06F 13/10 |

(Continued)

FOREIGN PATENT DOCUMENTS

EP 2271098 A1 1/2011

OTHER PUBLICATIONS

International Search Report and Written Opinion of the International Searching Authority, for International App. No. PCT/US2016/062024, dated Mar. 7, 2017, 11 pages.

*Primary Examiner* — Albert Cutler
(74) *Attorney, Agent, or Firm* — Perkins Coie LLP

(57) ABSTRACT

Described are techniques for video bridging for conversion of IP network video streams to the USB Video Class (UVC). The conversion of IP video to UVC video can include the use of software-only conversions and hardware assisted conversions, and can be done within purpose-built "conversion" devices or as software only solutions operating within applications or drivers within the operating systems of the "end nodes". The end-nodes simultaneously see and use multiple USB UVC video sources. The conversion process can also convert the USB UVC video control protocol to IP Video Stream control protocols.

19 Claims, 4 Drawing Sheets

(56) References Cited

U.S. PATENT DOCUMENTS

| | | | |
|---|---|---|---|
| 9,544,563 B1* | 1/2017 | Chin | H04N 9/79 |
| 2002/0057207 A1* | 5/2002 | Sgambati | H04B 1/207 |
| | | | 340/4.41 |
| 2007/0081562 A1* | 4/2007 | Ma | H04N 21/23406 |
| | | | 370/516 |
| 2010/0272021 A1* | 10/2010 | Kopplin | H04W 92/045 |
| | | | 370/328 |
| 2012/0269492 A1* | 10/2012 | Choi | H04N 5/775 |
| | | | 386/239 |
| 2012/0315852 A1 | 12/2012 | Mellacheruvu et al. | |
| 2014/0043495 A1* | 2/2014 | Bateman | H04N 7/181 |
| | | | 348/207.11 |
| 2016/0110682 A1* | 4/2016 | Teh | H04W 68/00 |
| | | | 705/28 |

\* cited by examiner

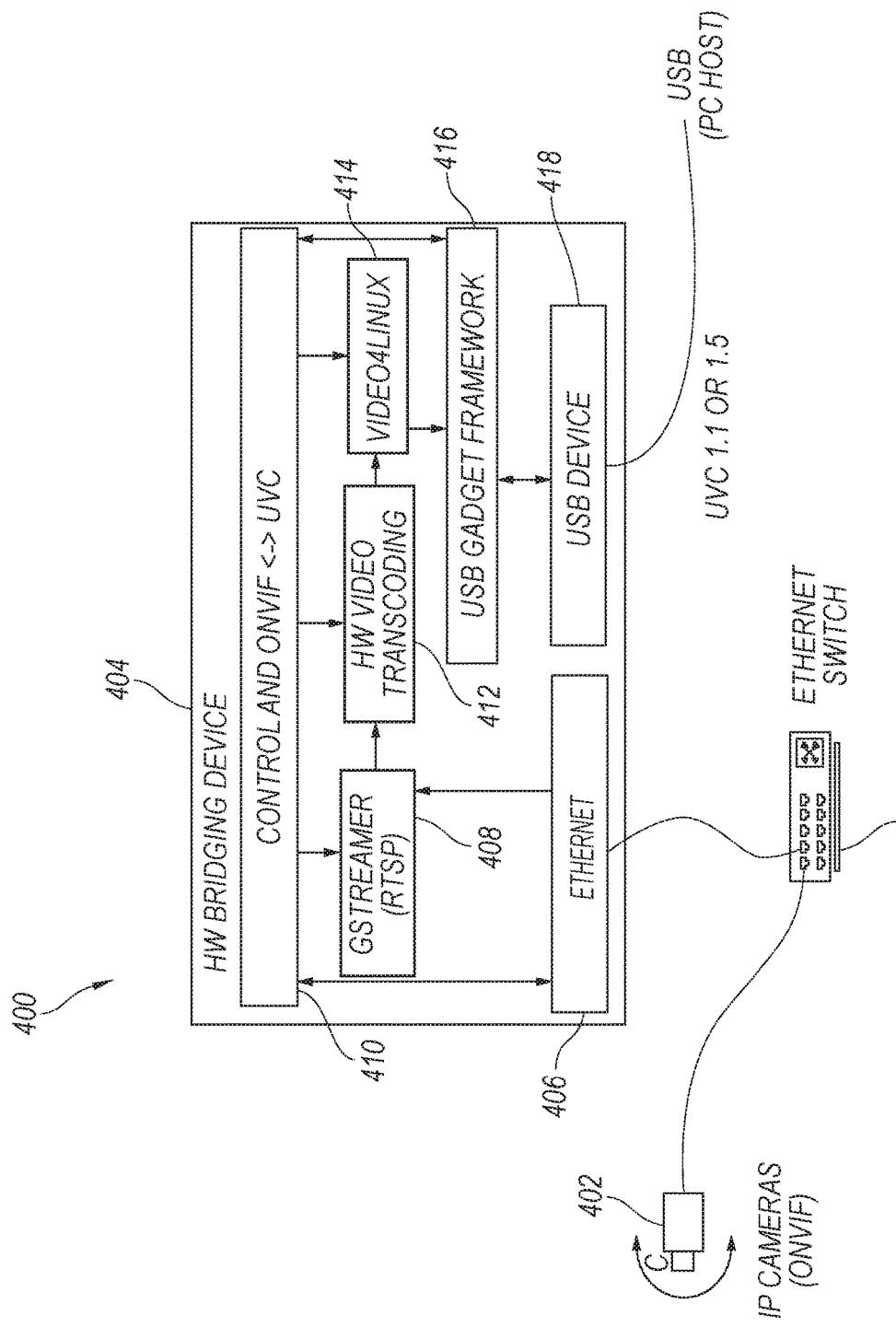

PERIPHERAL BUS VIDEO COMMUNICATION USING INTERNET PROTOCOL

TECHNICAL FIELD

This patent document relates to video communication, and in one aspect, transporting video data to and from a universal serial bus peripheral interface and an internet protocol interface.

BACKGROUND

With ever-increasing availability of high speed data networks and user devices that have computational power to process and display video in real time, videoconferencing is fast becoming a tool for both social networking, e.g., a video chat between two users, and also a business productivity tool, e.g., a video conference between multiple users in multiple locations. Video is often captured using a web camera that is connected to a user computer via a peripheral connection such as a Universal Serial Bus (USB) connection.

SUMMARY

The present document discloses techniques for allowing a user device to connect to a video camera via an internet protocol (IP) connection, while still allowing its operating system to use natively available video processing capabilities of a non-IP peripheral bus.

In one example aspect, a method of facilitating exchange of multimedia information between a camera device and a user device includes, for multimedia data received at an IP interface, translating the multimedia data from an IP format to a peripheral bus format and outputting the translated multimedia data on a peripheral bus. The method further includes, for a first control message received on the IP interface, translating the first control message to the peripheral bus format. The method also includes, for a second control message received on a peripheral bus interface, translating and transmitting the second control message on the IP interface.

In yet another aspect, a bridge apparatus for facilitating exchange of multimedia information between a camera device and a user device is disclosed. The apparatus includes an internet protocol (IP) interface communicatively coupling the apparatus to the camera device, a module that receives multimedia data via the IP interface in an internet video format and extracts compressed or uncompressed digital video, a module that reformats the extracted digital video into a peripheral bus format, a module that presents provides video in the peripheral bus format to the user device, a module that, for a first command received from the user device in the peripheral bus format, translates the first command into an internet format; and for a second command received from the IP interface in the internet format, translates the second command into the peripheral bus format, and a module that operates to provide connectivity between the user device and the camera device.

In yet another aspect, a system for video communication includes a camera apparatus coupled to an internet protocol (IP) network, a bridging apparatus having a first connection coupled to the IP network and a second connection with a peripheral bus, and a user device comprising a memory and a processor, wherein the processor executes an operating system that natively supports video communication over the peripheral bus, and wherein the bridging apparatus transcodes video between the IP network and the peripheral bus.

These and other aspects, and their implementations and variations are set forth in the drawings, the description and the claims.

BRIEF DESCRIPTION OF THE DRAWINGS

FIG. 4 is a block diagram of an example bridging apparatus.

DETAILED DESCRIPTION

Figure 1:
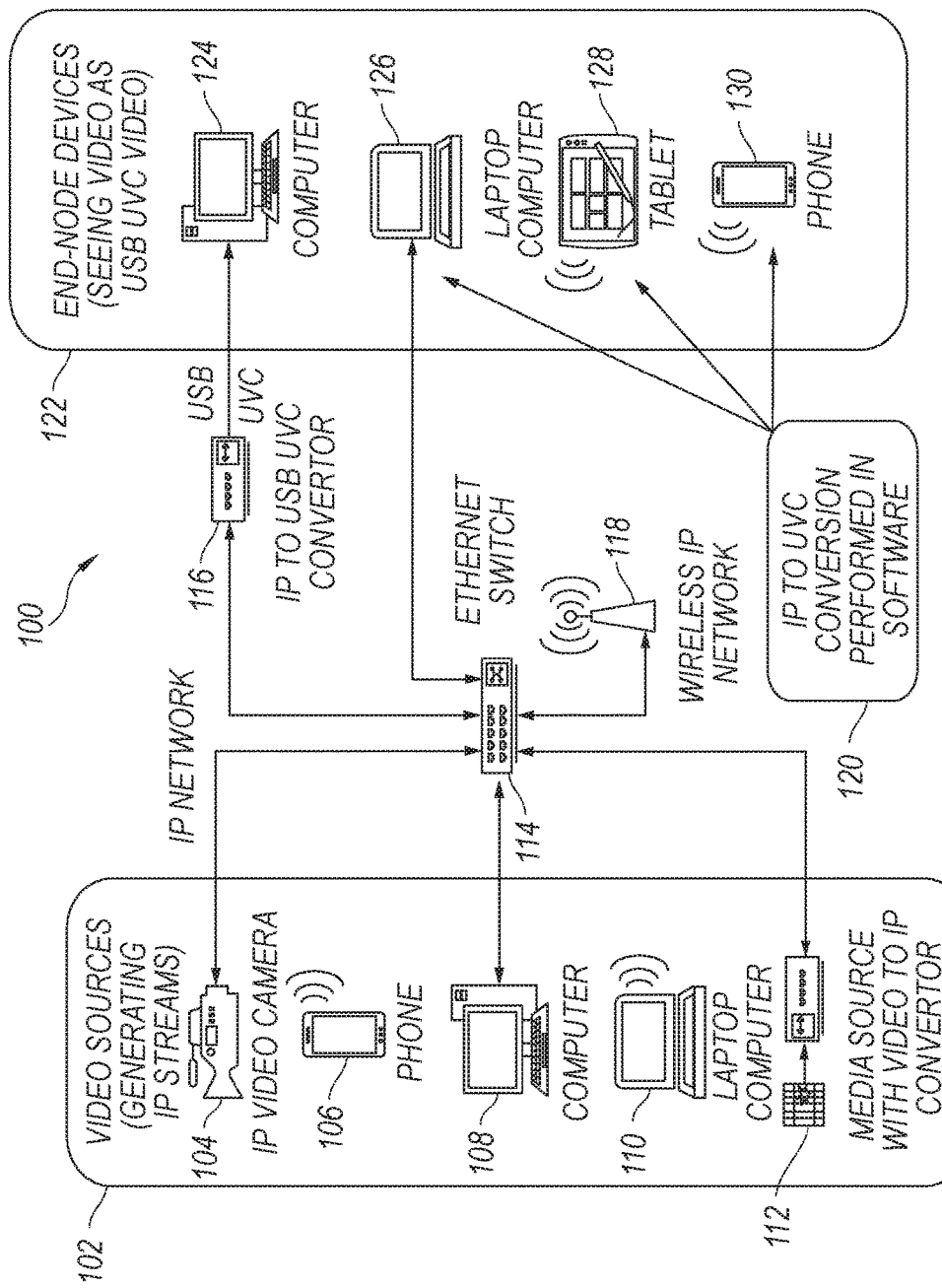
FIG. 1 is a block diagram of an example of an IP video communication system.

Today's computer operating systems natively support video camera using peripheral bus connections. For example, users often use external camera devices, e.g., webcams, for capturing video and/or audio and use then with software applications running on their devices. Many modern operating systems natively support camera functionalities along with device drivers for certain communication peripherals. The "native" support could mean, e.g., that a user need not install proprietary camera software drivers on their devices, and could simply plug a camera into the peripheral connection, wait for the operating system to recognize the camera and begin to use the camera in a matter of a few seconds.

One such example of natively supported camera functionality is the Universal Serial Bus (USB) interface commonly found in modern personal computers, tablets, laptops, and so on. Operating systems, such as various Windows versions by Microsoft, include video camera functionality with a native USB driver, thus providing a "plug-and-play" user experience for a USB-connected camera, without having to load camera-specific device drivers or any other new software.

Wireless implementations of USB connectivity are commercially available, but such products are not universally available, and often require users to install additional software to make the wireless functionality work. Thus, USB often limits connectivity between a user device and a camera device to a USB cable. The need for a wired connection thus limits the distance between the user device and the camera device to typical lengths of USB connectors, or up to about 10 meters or so. Furthermore, peripheral bus connection protocols such as USB are often point-to-point connections, meaning that only a single user device may be able to connect to and control a USB camera. A similar problem exits with other wired video transmission standards such as an High Definition Multimedia Interface (HDMI) connector or a Digital Visual Interface (DVI) cable connector.

Such limitations of a peripheral camera device limit the usefulness in many practical applications. For example, to access a USB camera in a conference room, multiple user may have to have their own, possibly long, USB cables plugged into an N:1 USB multiplexer that then provides a one-at-a-time access to users. Furthermore, USB user devices, or hosts, can connect to multiple video sources using USB, but the USB standard does not allow an external controller to tell the USB Host which video source to use at any given time. One solution may be that conference rooms are pre-wired with USB or HDMI or DVI or some other suitable cables such that multiple locations are available throughout the room to allow users to plug in their devices to cameras in the room. However, routing pre-fabricated cables with attached connectors through walls and conduit is difficult or impossible and often may cause destructive degradation in the quality of connection. Such installations may also need repeaters to stretch out lengths of connections, which is an expensive solution. To add to this, not all USB cable extenders support all USB webcams, making the process of selecting a correct cable difficult.

US Pat. Pub. No. 20090231485 to Stienke et al. discloses techniques for connecting a mobile device to an external display. In particular, a dongle that carriers video data over USB (encoded using UVC) protocol is disclosed to connect low resolution display on the mobile device side with a high resolution external display. The dongle performs resolution reduction from high resolution to low resolution.

U.S. Pat. No. 8,451,910 to Lohier et al. discloses operation of a wireless webcam that transmits video data in USB UVC format over a wireless Wi-Fi interface. The encoding of video is adapted to maintain isochronous nature of UVC video over the wireless interface.

US Pat. Pub. No. 20080147928 to Nicolet et al. discloses techniques for connecting a device to a host via multiple bus interfaces, such as USB UVC and wireless, such that the bus interface can be seamlessly switched during operation. The relationship between multiple busses of a single external device is tracked by maintaining a single Physical Device Object (PDO) for each device.

U.S. Pat. No. 8,019,917 to Chen et al. discloses an audio/video capture device that uses USB UVC protocol for transmitting audio video data to a host. In particular, the UVC protocol is modified to support multiple isochronous flows on the same USB connection. Video conferencing is specifically mentioned as an example application of the technology.

The prior art, however, fails to provide satisfactory solutions for some of the operational problems described herein.

The techniques described in the present document can be used to overcome these operational limitations, and others. In some embodiments, the disclosed technology can be used for conversion of IP network video streams to the USB Video Class protocol (USB UVC) and vice versa. In another advantageous aspect, the disclosed technology may be implemented in a bridging device that is external to the user device, or may be integrated to operate within the hardware platform of the user device, e.g., by an all-software or a combined hardware-software embodiment. These, and other, aspects are described in greater detail throughout this document.

FIG. 1 is a block diagram showing an example system 100 in which video may be communicated between various video sources 102 and end node devices 122 that consume the video, e.g., by displaying the video on a display to an end user. Video sources 102 may include devices that have a camera functionality built into them, such as a video camera 104 that may be directly able to communicate via an IP link, a phone with a built-in camera 106, a desktop computer 108 and a tablet or a laptop computer 110. Video sources may also include non-camera sources that still can produce video signals, e.g., a media source 112 with a video to IP convertor. The media source 112 maybe, e.g., a network reception device such as a set-top box, or a scanner or a film-to-digital video convertor and so on.

The video sources 102 may communicate with the end node devices 122 via an IP network that includes IP network equipment such as an Ethernet switch 114, a wireless IP transmitter such as a base station of a cellular system or an access point of a Wi-Fi network and and/or other IP functions that are well known to a person of skill in the art. In general, the IP network may comprise multiple wired and wireless networks connected to each other.

By way of example, and not exhaustively, end-node devices may be a personal computer 124, a laptop computer 126, a tablet 128, and/or a phone with an image display 130. An end-node device 122 may be able to send and receive data, including video data, via an IP interface such as a wired or a wireline IP interface.

The computational platform on which an end node device 122 operates may include an operating system. Many operating systems, e.g., various Windows versions by Microsoft, provide native support for being able to receive and transmit video data and control data related to the video data.

Figure 2:
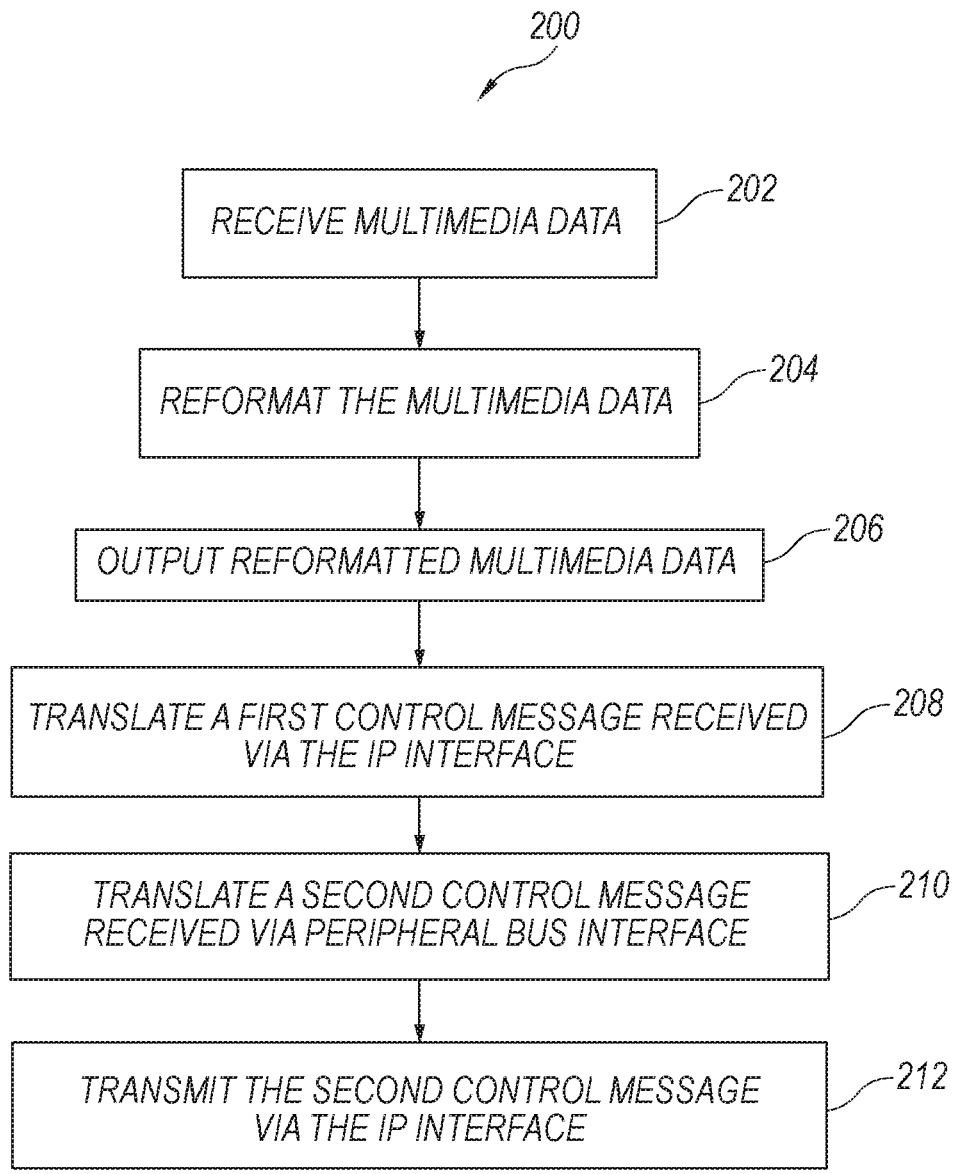
FIG. 2 is a block diagram depiction of an example software protocol stack implementation in a user device.

FIG. 2 is a flowchart for an example method 200 of facilitating exchange of multimedia information between a camera device, e.g., a video source 102, and a user device, e.g., the end-node devices 122. The method 200 may be implemented by a bridging device, e.g., the bridging device 116.

The method 200 includes, at 202, receiving multimedia data via an IP interface. In various embodiments, the IP interface may be wired or wireless, e.g., using cat5 Ethernet cable, as described in this document.

The method 200 includes, at 204, transcoding the multimedia data from an IP format to a peripheral bus format. For example, in some embodiments, the IP format may include compressed digital video in H.264 compression format, which is then transmitted using MPEG-2 transport packets over IP. In some embodiments, the IP format may include an uncompressed video format, e.g., IETF format specified in RFC 4175, or uncompressed video format specified by the Video Services Forum. In some embodiments, the peripheral bus format may include the UVC format for carriage of video over USB, which supports the carriage of both compressed and uncompressed video. Other examples of IP formats may include RTP using MPEG-2 compression, H.265 (High efficiency video coding HEVC), VP 8/9 video compression, MPEG-DASH or HLS streaming format, or other suitable format. The peripheral bus format may include other peripheral bus formats, such as DisplayPort, HDMI, etc.

The method 200 includes, at 206, outputting the reformatted multimedia data on a peripheral bus. One such example of a suitable peripheral bus includes USB, which is natively supported by the operating system of the user device receiving the video data. Native support may be provided, e.g., by bundling software used for operation of the peripheral bus with the installation of the operating system. The software may include, e.g., a driver software that detects plugging/unplugging of external devices to the peripheral bus and receiving and transmitting data over the peripheral bus.

The method 200 includes, at 208, translating, for a first control message received on the IP interface, the first control message to the peripheral bus format. The translation may be performed using a look up table (LUT) mechanism. The first control message may be, e.g., an ONVIF control message.

The method 200 includes, at 210, translating, for a second control message received on a peripheral bus interface, the second control message into an IP interface format. The translation may be performed using the LUT mechanism. In some embodiments, the second control message may include a USB UVC control message and the IP interface format may include the ONVIF protocol.

The method 200 includes, at 212, transmitting the translated second control message via the IP interface. For example, the translated second control message may comply with Open Network Video Interface Forum (ONVIF) format.

Figure 3:
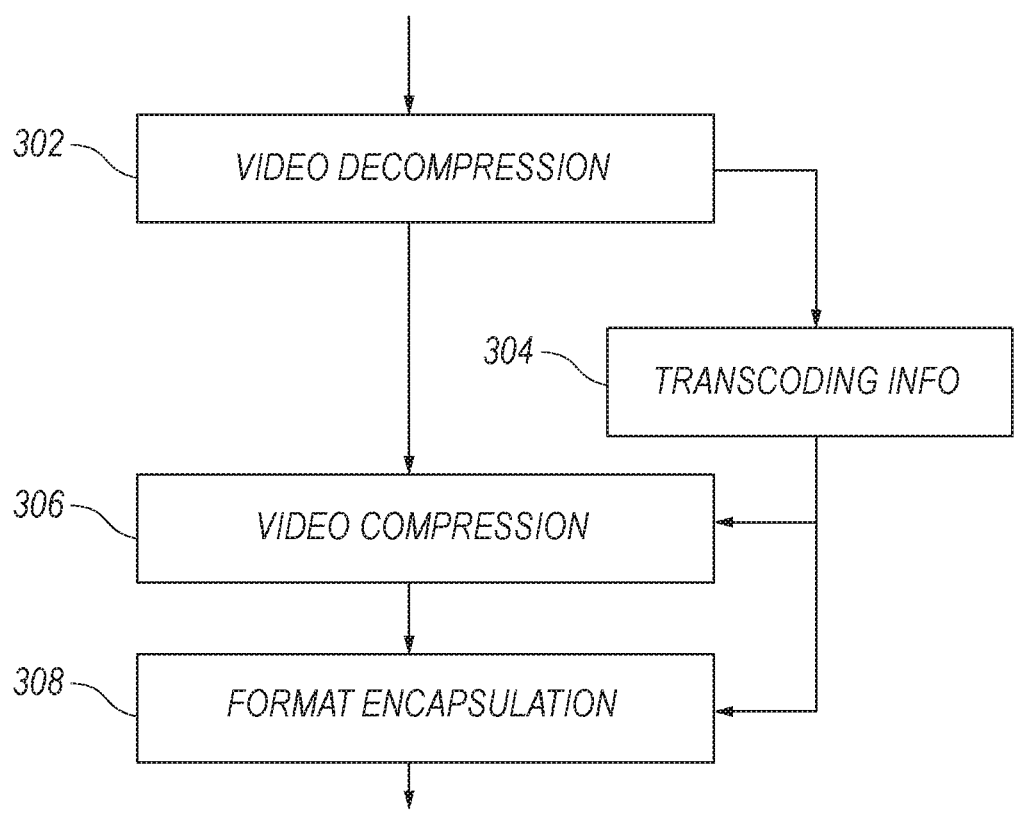
FIG. 3 is a block diagram of an example video transcoding implementation.

In some embodiments, the transcoding operation may comprises operations as described in the example shown in FIG. 3. FIG. 3 is a block diagram showing an example of a video transcoding operation. Box 302 represents decompression operation, in which video received on the IP interface may be decompressed. The decompression 302 may be performed using code executed on a processor, in the hardware, or using a combination of hardware acceleration and software execution of the decompression operation. During this operation, transcoding info 304 may be extracted. This information may include information, e.g., motion vector data, useful for efficient re-encoding by the video recompression operation 306. Other information extracted for transcoding may include command and control information, and information that is often included in the user data fields of formats such as H.264, which is useful for an application presenting the information to a user. Such information may include caption data, color space definition, and so on. The information is provided to the format encapsulation stage 308 in which the output of the video recompression operation 306 is formatted to comply with encoded video format of the peripheral bus on which the transcoded video is sent to the user device 122.

The recompression operation 306 may produce, e.g., motion Joint Pictures Experts Group (MJPEG) compatible video output from received H.264 video. In some embodiments, when uncompressed video is received via the IP interface, the uncompressed video may be transcoded into an compressed video format such as MJPEG. In such embodiments, the decompression operation 302 may be omitted or alternatively may simply involve packet header removal of received IP packets to extract the video data payload. In some embodiments, when uncompressed video is received via the IP interface, the uncompressed video may be left uncompressed when transferring out over the peripheral bus. In such embodiments, the operations described in FIG. 3 may simply be omitted; instead, video payload from IP packets may be extracted and re-encapsulated into USB UVC format.

On the IP network side, any well-known video compression and transportation format may be used. The video encoding format may be H.264, HVEC/H.265, MJPEG, etc. Transportation may be performed using MPEG transport encapsulated within IP packets, RTSP, RTP or .mp4 file format using unicast, multicast or broadcast transmission.

In some embodiments, the conversion of IP video to UVC video can be done in the bridging device or as a software solution operating within applications or drivers within the operating systems of the end nodes or user devices.

In one advantageous aspect, because the IP network allows for communication to/from multiple cameras, and because the bridge device is able to monitor and translate control data, end-nodes 122 can simultaneously see and use multiple video sources, e.g., USB UVC cameras. Similarly, multimedia data from a given camera can be transmitted to multiple end-nodes 122 at the same time. This may be achieved such that the bridging device 116 may receive a single video stream from the source, and may produce multiple outputs on multiple USB UVC connections for multiple end-nodes.

In one advantageous aspect, embodiments can overcome limitation associated with certain peripheral bus standards that allow for a peripheral device to connect only with a single user device (host) at a time. Using the disclosed techniques, USB devices can be connected to multiple end-nodes simultaneously.

In another advantageous aspect, video distribution can be achieved using low-cost and ubiquitously available Ethernet networking technology for carriage of IP traffic, thereby making it un-necessary to use expensive HDMI or DVI outputs and corresponding distribution amplifiers to distribute video to multiple locations. Ethernet distribution allows as many Hosts as Ethernet can support (thousands) to simultaneously connect to the same video source. Cat5 or Cat6 cable could be used for Ethernet wiring. Such cables can be built on-site after routing them through walls and conduit, thus making the installation process inexpensive. Individual Ethernet Cat5 and Cat6 cables can operate for distances of 100 m without extenders or extra switches.

Furthermore, allowing multiple users to simultaneously access and control the video stream and to also support multiple access locations opens up the possibility of additional application-layer features that are not offered by present-day videoconferencing applications.

In some embodiments, the bridging device 116 may present itself as a single video source to a USB Host and it can switch its input to use any source on the Ethernet network at the request of any external controlling device.

Historically, IP camera and IP streaming vendors used proprietary control protocols, which makes it difficult for any given user device to operate with multiple cameras, either simultaneously or at different times, without performing cumbersome software installations.

The ONVIF control protocol, defined by the Open Network Video Interface Forum, provides a video control and streaming protocol that allows cameras and other video sources to operate in a uniform manner, allowing a controller supporting ONVIF to work with many different video device manufacturers. Advantageously, the bridging device 116 could convert control commands in the peripheral bus format to the common ONVIF commands and ONVIF IP video streams to USB UVC video streams.

For example, the ONVIF has defined a protocol called PTZ (pan tilt zoom) Service Specification. Using this protocol, a camera can be controlled to perform various operations such as zooming in or out, tilting, panning at a specified velocity, queried for its capabilities, and so on. The bridging device 116 may implement a look-up-table (LUT) for control command translations as described in operations 208 and 210. The LUT may have multiple columns corresponding to multiple peripheral bus protocols, and a column corresponding to the ONVIF protocol. Each row may provide a translation of a given ONVIF command and a corresponding peripheral bus command. Using the command translation LUT, the bridging device 116 may perform command translation such that a user device may use its own peripheral bus specific protocol for controlling the camera, while camera is always being controlled by a uniform, single control protocol.

In some embodiments, the method 200 may also include handling of audio data. The multimedia data may be video only, audio and video, or audio only depending on how users have set up their conference sessions. In some embodiments, the audio may be received using a microphone that is co-located with the camera (e.g., camera lens). Alternatively, audio may be received and digitized using a microphone that is nearby a user, e.g., a built-in audio capture function of the user device. Because audio processing often experiences delays that are significantly shorter than the corresponding video processing delays (e.g., 10 to 20 milliseconds instead of 1 to 2 seconds for video), the bridging device 116 may include a buffer for storing audio temporarily for lip synchronization or alignment with the corresponding video. In some embodiments, a user interface control may be provided on the bridging device, or on the application running on a user device that is using the multimedia data, to enable user control of lip synchronization delay adjustment.

FIG. 4 illustrates an example embodiment of a bridging device 404. The bridging device may include an Ethernet interface 406 via which it is able to communicate with the Internet, and in particular IP cameras 402, through a possible Ethernet switch 114. The IP camera 402 may implement a camera control API, e.g., ONVIF API for remotely controlling the camera. The bridge device 404 may receive video from the IP camera 402 in H.264 or another video format via the Ethernet module 406. The Ethernet module 406 may provide control portion of the received IP traffic to a Control and Translation module 410, which may, among other things, perform translation between ONVIF commands and UVC commands.

The Ethernet module 406 may provide the multimedia portion, which may include video and/or audio data, to a media handling module 408, such as a Gstreamer module that implements RTSP functionality to receive and/or transmit multimedia data. The media handling module 408 may extract the received video and provide the extracted video to a transcoding module 412. The reformatted multimedia data may be provided to a capture module 414. The capture module 414 may be situated within the bridge device 404 such that, at the output of the capture module, the reformatted multimedia data may appear as if it has been captured by a camera plugged into a peripheral of the host device.

The transcoding module 412 may reformat the multimedia data to conform to the peripheral bus standard at its output. The transcoding module 412 may also perform any other control functions such as bitrate change, resolution change, color space rotation, gamma correction, etc., should under the control of the Control and Translation module 410.

A driver module 416 may be used to communicate with the capture module 414 and the Control and Translation module 410 such that the control data and the multimedia data is passed via the driver module 416, which makes it appear to a host interface module 418 as if the IP camera 402 is locally plugged into the bus. For example, the host interface module 418 may correspond to a USB device and the driver module 416 may comprise the USB gadget framework. The host interface module 418 may be communicatively connected with a user device via a USB connector and may be using a peripheral bus format such as the UVC 1.1 or UVC 1.5 format.

It will be appreciated that the embodiment depicted in FIG. 4 can be operated such that, from the perspective of the applications running on the user device, it may appear that a camera is plugged into the peripheral socket, e.g., USB connector of the user device. It will further be appreciated that most operating systems include support for certain types of peripheral devices. For example, in the embodiment depicted in FIG. 4, an IP camera that is remotely present in the IP network is able to be communicatively connected with a user device simply by the user device communicating with a bridge device via USB peripheral bus.

In some example embodiments, an apparatus for facilitating exchange of multimedia information between a camera device and a user device includes an IP interface communicatively coupling the apparatus to the camera device. The apparatus may include a module that receives multimedia data via the IP interface in an internet video format and extracts digital video, either compressed or uncompressed, e.g., by parsing using a software program executed on a processor. The apparatus also includes a module that reformats the extracted digital video into a peripheral bus format, e.g., using a LUT mechanism. The apparatus includes a module that provides video in the peripheral bus format to the user device, e.g., using a software driver executed on the user device. The apparatus includes a module that, for a first command received from the user device in the peripheral bus format, translates the first command into an internet format, and for a second command received from the IP interface in the internet format, translates the second command into the peripheral bus format. The apparatus also includes a module that operates to provide connectivity between the user device and the camera device. The translation may be performed using the LUT mechanism.

In some embodiments, a system for video communication includes a camera apparatus (e.g., 102) coupled to an internet protocol (IP) network, a bridging apparatus (e.g., 116) having a first connection coupled to the IP network and a second connection with a peripheral bus, and a user device (e.g., 122) comprising a memory and a processor, wherein the processor executes an operating system that natively supports video communication over the peripheral bus. The bridging apparatus (e.g., 116) transcodes video between the IP network and the peripheral bus. The camera apparatus is controllable using the ONVIF PTZ protocol.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of facilitating exchange of multimedia information between one or more camera devices and a plurality of user devices, comprising:
    receiving multimedia data via an Internet Protocol (IP) interface;
    transcoding the multimedia data from an IP format to a peripheral bus format;
    outputting the reformatted multimedia data on a peripheral bus;
    translating, for a first control message received on the IP interface, the first control message to the peripheral bus format; and
    converting, for a second control message received on a peripheral bus interface, the second control message into an IP interface format; and
    transmitting the translated second control message via the IP interface;
    wherein the translating comprises looking up a look-up table (LUT) for translation of the first control message;
    wherein the LUT has multiple columns corresponding to multiple peripheral bus protocols, and multiple rows, wherein each row provides a translation of a command to a peripheral bus command; and
    wherein each user device uses its own peripheral bus protocol for controlling the one or more camera devices so that the plurality of user devices simultaneously access and control video streams provided by the one or more camera devices while the one or more camera devices are being controlled by a uniform, single control protocol.

2. The method of claim 1, wherein the first control message comprises a device discovery message.

3. The method of claim 1, wherein the multimedia data comprises compressed video and wherein the transcoding includes:
    decompressing the compressed video to produce uncompressed video; and
    recompressing the uncompressed video in a format compliant with the peripheral bus format.

4. The method of claim 3, wherein the format compliant with the peripheral bus format includes motion Joint Pictures Experts Group (MJPEG) format.

5. The method of claim 1, wherein the multimedia data received at the IP interface includes video data received from the one or more camera devices and related audio data received from a microphone, wherein the reformatting includes buffering the audio data for achieving lip synchronization between the audio data and the video data.

6. The method of claim 1, wherein the peripheral bus is a universal serial bus (USB), and wherein the peripheral bus format comprises USB video class (USB UVC) protocol.

7. The method of claim 1, further including:
    outputting the multimedia data on another peripheral bus.

8. The method of claim 1, wherein the IP interface format comprises an Open Network Video Interface Forum (ONVIF) pan-tilt-zoom (PTZ) format.

9. The method of claim 1, wherein the multimedia data includes audio data and wherein the method further includes buffering the audio data for alignment with video data.

10. An apparatus for facilitating exchange of multimedia information between one or more camera devices and a plurality of user devices, comprising:
    an internet protocol (IP) interface communicatively coupling the apparatus to the one or more camera devices;
    a module that receives multimedia data via the IP interface in an internet video format and extracts digital compressed video;
    a module that reformats the extracted digital compressed video into a peripheral bus format;
    a module that presents video in the peripheral bus format to at least one of the plurality of user devices;

a module that, for a first command received from the at least one of the plurality of user devices in the peripheral bus format, translates, by looking up a look-up table (LUT) for translation, the first command into an internet format; and for a second command received from the IP interface in the internet format, translates the second command into the peripheral bus format; and a module that operates to provide connectivity between the at least one of the plurality of user devices and the one or more camera devices;

wherein the LUT has multiple columns corresponding to multiple peripheral bus protocols, and multiple rows, wherein each row provides a translation of a command to a peripheral bus command; and wherein each user device uses its own peripheral bus protocol for controlling the one or more camera devices so that the plurality of user devices simultaneously access and control video streams provided by the one or more camera devices while the one or more camera devices are being controlled by a uniform, single control protocol.

11. The apparatus of claim 10, wherein the first command comprises a device discovery message.

12. The apparatus of claim 10, wherein the multimedia data comprises compressed video and wherein the transcoding includes:
decompressing the compressed video to produce an uncompressed video; and
recompressing the uncompressed video in a format compatible with the peripheral bus format.

13. The apparatus of claim 12, wherein the format compatible with the peripheral bus format includes motion Joint Pictures Experts Group (MJPEG) format.

14. The apparatus of claim 10, wherein the multimedia data received at the IP interface includes video data received from the one or more camera devices and related audio data received from a microphone and wherein the reformatting includes buffering the audio data for achieving lip synchronization between the audio data and the video data.

15. The apparatus of claim 10, wherein the peripheral bus is a universal serial bus (USB) and wherein the peripheral bus format comprises USB video class (USB UVC) protocol.

16. A system, comprising:
one or more camera apparatuses coupled to an internet protocol (IP) network;
a bridging apparatus having a first connection coupled to the IP network on which the bridging apparatus receives a video stream and second connections with multiple peripheral busses; and
a plurality of user devices, each user device comprising a memory and a processor, wherein the processor executes an operating system that natively supports video communication over one of the multiple peripheral busses; and
wherein the bridging apparatus transcodes the video stream between the IP network and the multiple peripheral busses; and
wherein each user device uses its own peripheral bus protocol for controlling the one or more camera apparatuses so that the plurality of user devices simultaneously access and control video streams provided by the one or more camera apparatuses while the one or more camera apparatuses are being controlled by a uniform, single control protocol.

17. The system of claim 16, wherein the one or more camera apparatuses are controllable using an Open Network Video Interface Forum (ONVIF) pan-tilt-zoom (PTZ) protocol.

18. The system of claim 16, wherein the transcoding operation comprises looking up a look-up table (LUT) for translation of a control message.

19. The system of claim 16, wherein the multimedia data includes audio data, and wherein the bridging apparatus includes a buffer for temporarily storing the audio data for alignment with video data.

* * * * *